United States Patent

Wigley

[15] 3,637,932

[45] Jan. 25, 1972

[54] TELEVISION SET CHASSIS HAVING VERTICAL PLUG IN CIRCUIT BOARDS

[72] Inventor: Patrick A. Wigley, Scarborough, Ontario, Canada

[73] Assignee: Clairtone Sound Corporation Limited, Rexdale, Ontario, Canada

[22] Filed: July 7, 1969

[21] Appl. No.: 839,356

[30] Foreign Application Priority Data

June 13, 1969 Canada ..................................054,257

[52] U.S. Cl. .....................178/7.9, 317/101 CB, 317/101 DH
[51] Int. Cl. .......................................................H01j 29/02
[58] Field of Search ..........178/7.9; 317/99, 101 CB, 101 DH

[56] References Cited

UNITED STATES PATENTS

| | | | |
|---|---|---|---|
| 2,691,724 | 10/1954 | Hoffman | 317/101 CB |
| 2,945,989 | 7/1960 | Vogel et al. | 317/101 DH |
| 2,958,014 | 10/1960 | Blain | 317/101 DH |
| 3,048,747 | 8/1962 | Errichiello | 317/101 CB |
| 3,104,282 | 9/1963 | Horn et al. | 317/101 DH |

FOREIGN PATENTS OR APPLICATIONS

| | | | |
|---|---|---|---|
| 863,644 | 3/1961 | England | 178/7.9 |

*Primary Examiner*—Robert L. Griffin
*Assistant Examiner*—Richard K. Eckert, Jr.
*Attorney*—Rogers, Bereskin & Parr

[57] ABSTRACT

A color television set chassis extending across the rear edge of the set and containing plug-in circuit boards orientated in a vertical plane and extending in a front to rear direction. The boards are inserted and removed from the rear and plug into an interconnecting board across the front of the chassis, with controls on the boards projecting through the rear cover of the set. The chassis is open at its top and bottom for ventilation. The tuner assembly is located at one side of the chassis, and the boards contain components arranged in a specific order which both separates the functions as between the boards and also simplifies the wiring needed.

11 Claims, 13 Drawing Figures

INVENTOR.
PATRICK A. WIGLEY
BY Rogers, Bereskin, & Parr

INVENTOR.
PATRICK A. WIGLEY
BY Rogers, Bereskin, & Parr

INVENTOR.
PATRICK A. WIGLEY

BY Rogers, Bereskin, & Parr

INVENTOR.
PATRICK A. WIGLEY

BY Rogers, Bereskin, & Parr

INVENTOR.
PATRICK A. WIGLEY
BY Rogers, Bereskin, & Parr

INVENTOR.
PATRICK A. WIGLEY
BY Rogers, Bereskin, & Parr

TELEVISION SET CHASSIS HAVING VERTICAL PLUG IN CIRCUIT BOARDS

This invention relates to television sets, and more particularly, it relates to an improved chassis arrangement which facilitates manufacture and servicing of television sets, particularly color television sets.

Television sets, particularly color sets, normally contain a large number of circuits and components. In the past, these circuits with their components have usually been mounted on one large horizontally oriented chassis fastened to the frame of the television set, with connecting wires extending to the various parts of the chassis, the tuner, to the picture tube, and to the various controls. Servicing of such sets has been difficult since removal of the entire chassis is required if probing of connections in cramped quarters is to be avoided. In addition, cooling of the components has not been uniform. Because of this, attempts have been made to mount many of the components on individual circuit boards so that they can more easily be removed for servicing. However, the arrangements adopted in the past for the circuit boards has been generally unsatisfactory, since it has still been difficult to remove the circuit boards for testing, and since the circuit boards have not been laid out in a manner that would permit uniform cooling. In addition, the prior art attempts have not facilitated an efficient wiring scheme of the sets.

Accordingly, it is an object of the present invention to provide a television set chassis which extends across an edge of the set and which has individual plug-in circuit boards vertically oriented and which may be plugged in and removed from one side of the set, preferably the rear side. In a preferred embodiment, most of the components of the set are mounted on the circuit boards and the circuit boards are arranged in a specific order to make possible an efficient wiring pattern.

Further objects and advantages of the invention will appear from the following description, taken together with the accompanying drawings, in which:

FIG. 1 is a rear perspective view of the frame of a color television set with its picture tube shown in dotted lines and with a chassis of the present invention in position, the chassis being shown without wiring or circuit boards;

FIG. 1*a* is a side view of the apparatus of FIG. 1;

Figures 1, 1A:
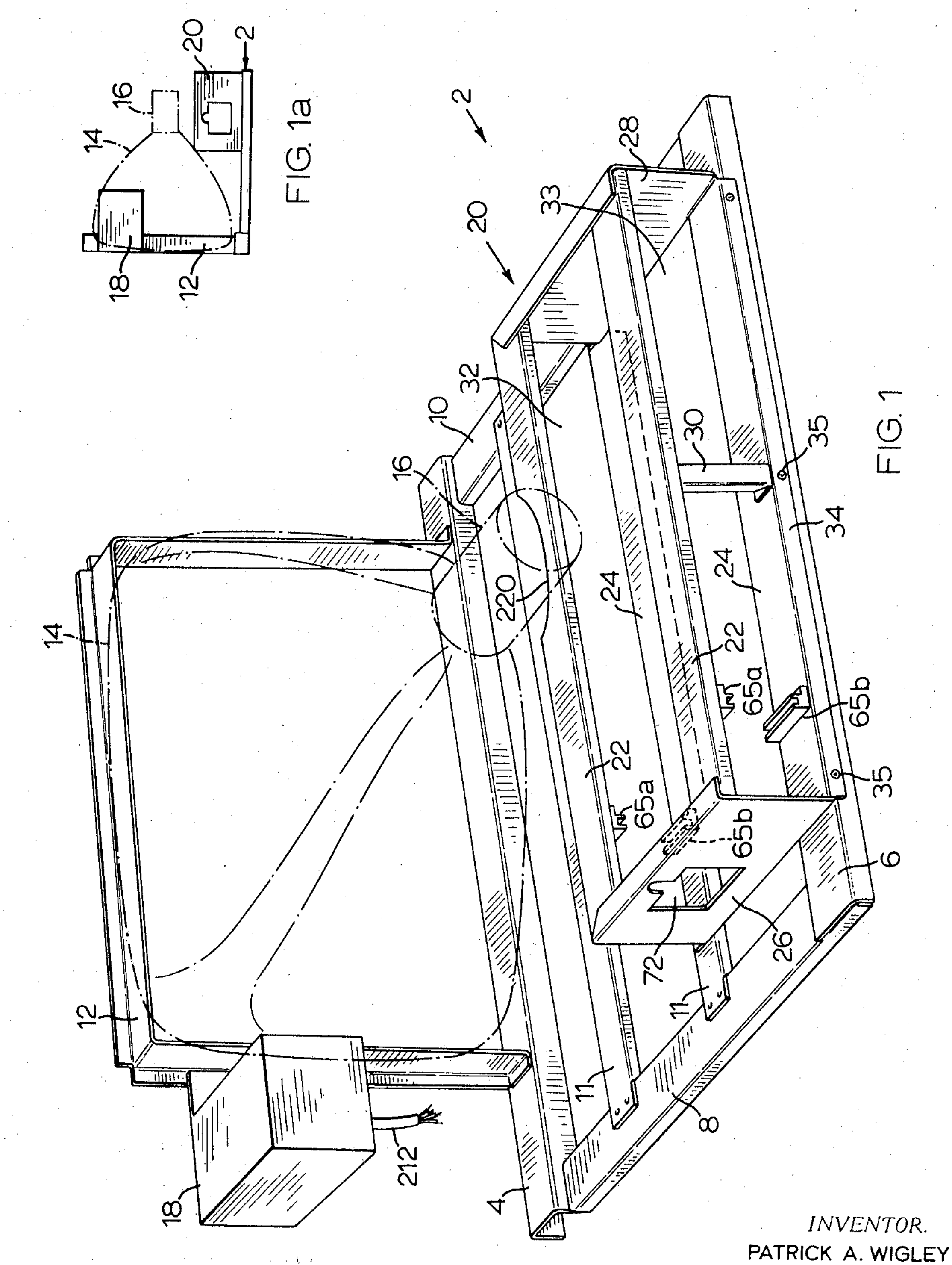

Reference is first made to FIG. 1, which shows at 2 a sheet metal television set frame. The frame includes a front channel member 4, a rear flanged member 6, and a pair of side flanged members 8, 10 connecting the front and rear members. A pair of intermediate supports 11 also extend between the side members 8, 10 to rigidify the frame while leaving it substantially open for air circulation. The frame members are held together by conventional means, such as rivets or welding.

Mounted on the frame front member 4 is a vertically oriented rectangular subframe 12 which serves to support the picture tube indicated in dotted lines at 14. The picture tube is supported conventionally on the subframe 12 by a harness support not shown. Mounted near the tip of the picture tube are a yoke assembly and a convergence assembly, both diagrammatically indicated at 16.

Also mounted on the subframe 12, beside the picture tube, is a tuner assembly 18.

Figure 2:
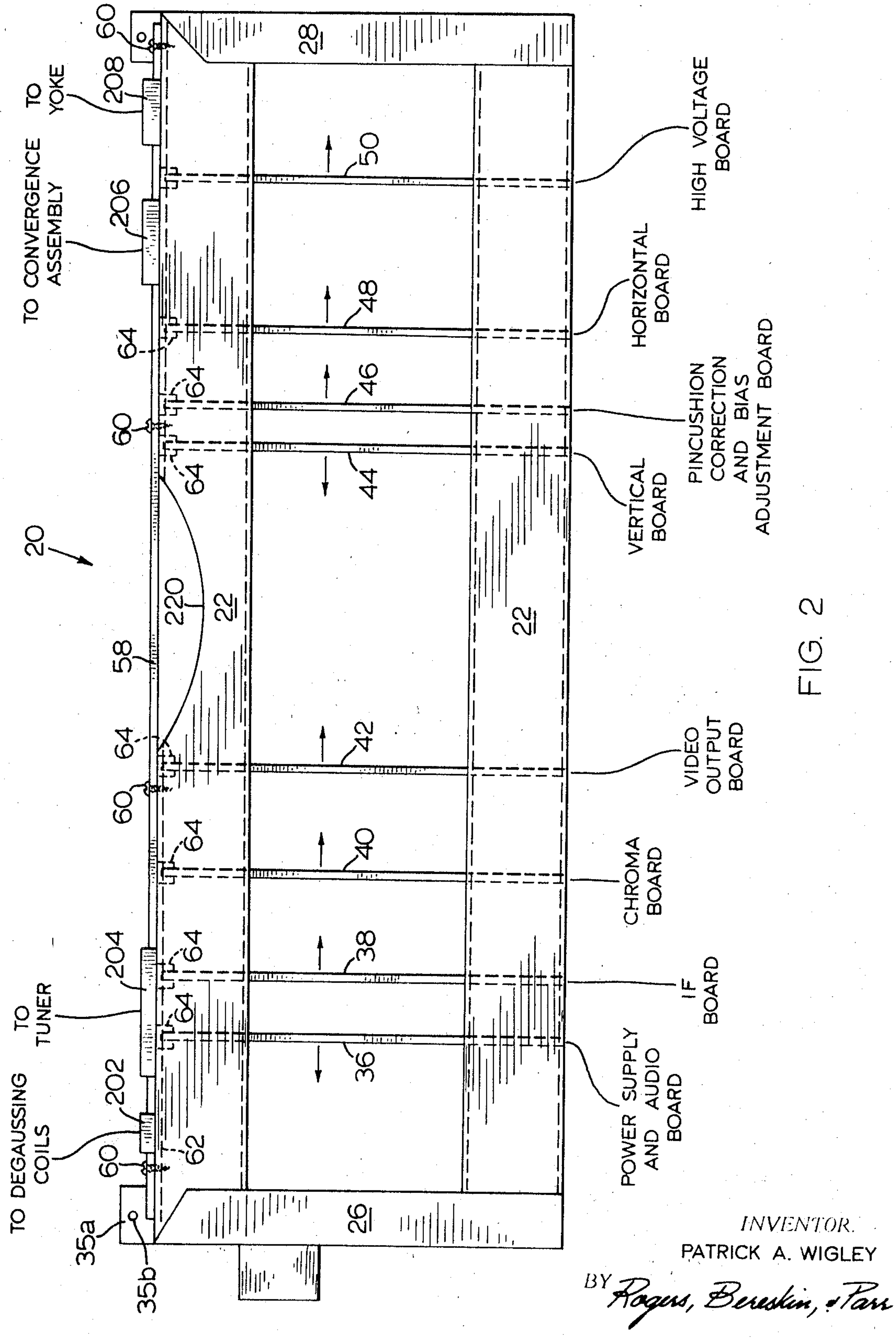
FIG. 2 is a top view of the chassis shown in FIG. 1.

Most of the components of the set are mounted in a chassis 20 shown in FIG. 1 and also shown in FIG. 2. The chassis 20 is formed of sheet metal and includes a pair of elongated top bars 22 and a pair of elongated bottom bars 24 joined by sheet metal sides 26, 28 and by a rear support strut 30. The top bars 22 define between them an open space 32, and the bottom bars 24 define between them a similar open space 33, to permit air circulation through the components mounted on the chassis. The rearmost bottom bar 24 includes a downwardly extending flange 34 which abuts against the frame rear member 6 to locate the chassis at the rear of the frame. Screws 35 fasten the rear of the chassis to the frame. The front of the chassis contains bottom extension flanges **35*a* having holes 35*b* through which screws are inserted to fasten the front of the chassis to the members 11**.

Figure 4:
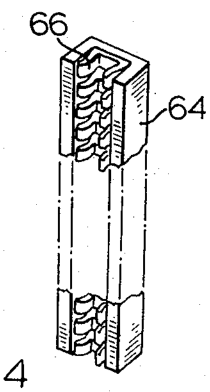
FIG. 4 is a perspective view of a connector for use with circuit boards of the type shown in FIG. 3.
Figure 3:
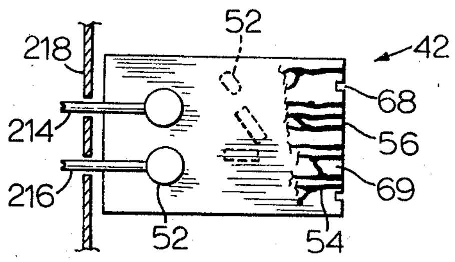
FIG. 3 is a perspective diagrammatic view of a circuit board for use with the chassis of FIG. 2.

The chassis 20 contains eight circuit boards 36 to 50 inclusive, shown in FIG. 2 but not in FIG. 1. A typical circuit board 42 is shown in FIG. 3. As shown, the circuit board 42 comprises a rectangular piece of insulating material with components 52 mounted thereon, and with printed circuit wiring 54 interconnecting the components. The printed circuit wiring 54 extends to the front edge 56 of the board and terminates there, so that the boards can be plugged into an interconnecting board 58 (FIG. 2) mounted along the front surface of the chassis 20 by screws 60 which extend into the walls 62 of the front bars of the chassis. To permit plug-in connection to it, the board 58 contains a number of elongated connectors 64 (FIG. 4) extending vertically thereon and having spring metal connector clips 66 therein to mate with the wiring 56 on the printed circuit boards. To ensure that a circuit board cannot be plugged into the wrong connector 64, two of the unused connector clips 66 in each connector 64 are filled with plastic, and two corresponding notches 68 are formed in the front edge of each circuit board. The plastic filled unused connector clips are located in a different position for each connector 64, and therefore the notches 68 are located in different positions for each circuit board, so that no circuit board can be plugged into any location other than its intended location. Each circuit board has four locations 69 in which there is no wiring, for different notch combinations.

The circuit boards 36 to 50 each run on top and bottom glides **65*a*, 65*b* (FIG. 1) fastened to the top and bottom bars of the chassis 20. The glides for each circuit board are arranged so that the boards are vertically aligned and horizontally spaced one from the other. The arrows in FIG. 2 indicate the direction in which components project from each circuit board (the other side of each board contains the printed circuit). Since the back of the chassis 20 is open, the circuit boards 36 to 50** can be inserted or removed through the back of the chassis.

The circuit boards 36 to 50 are arranged in a specific pattern which will now be described. Specifically, the circuit boards are as follows:

| CCT. BOARD NO. | BOARD FUNCTION |
|---|---|
| 36 | Power supply and audio board |
| 38 | Intermediate frequency (IF) board |
| 40 | Chroma board |
| 42 | Video output board |
| 44 | Vertical board |
| 46 | Pincushion correction and bias adjustment board |
| 48 | Horizontal deflection board |
| 50 | High-voltage board |

The components on each board will now be generally described with reference to the block diagrams of FIGS. 5 to 12. Since the circuits of FIGS. 5 to 12 are block diagrams, only main elements and leads are shown. The individual circuits are conventional; it is their spacial arrangement with which the present invention is concerned.

Figure 5:
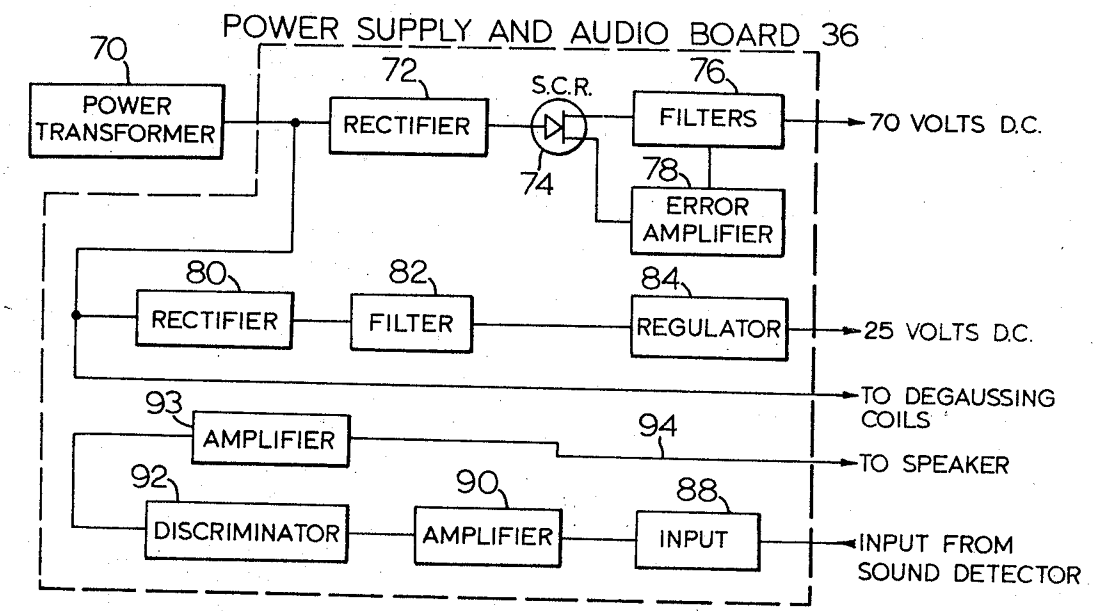

FIG. 5 illustrates the power supply and audio board 36. This board receives power from a power transformer 70 mounted in a cooperating hole 72 in the side 26 of the chassis 20, the connection being via the interconnecting board 58. The power is passed to a rectifier stage 72 which delivers rectified current through silicon controlled rectifiers 74 and then through filters 76 to provide 70 volts DC for the various components of the set. An error amplifier 78 is connected between the filters 76 and the silicon controlled rectifiers 74 to regulate the output. A further output is taken through rectifier 80, filter 82, and a regulator 84 to provide a lower voltage output. Further power is taken via a lead 86 from the power transformer circuit to the degaussing coils (not shown) of the set.

The board 36 also contains the audio amplifier components of the set. Specifically, the board 36 includes an input stage 88 which receives signals from the sound detector of the IF board 38. The input signal is amplified in an amplifier 90 and passes through a discriminator 92 to provide an audio signal which is amplified in amplifier 93 and then directed via a lead 94 to the speaker of the set. All of the interconnections shown at the right-hand edge of the circuit board 36 (and of the other circuit boards to be described) are of course via the interconnecting board, unless otherwise state.

Figure 6:
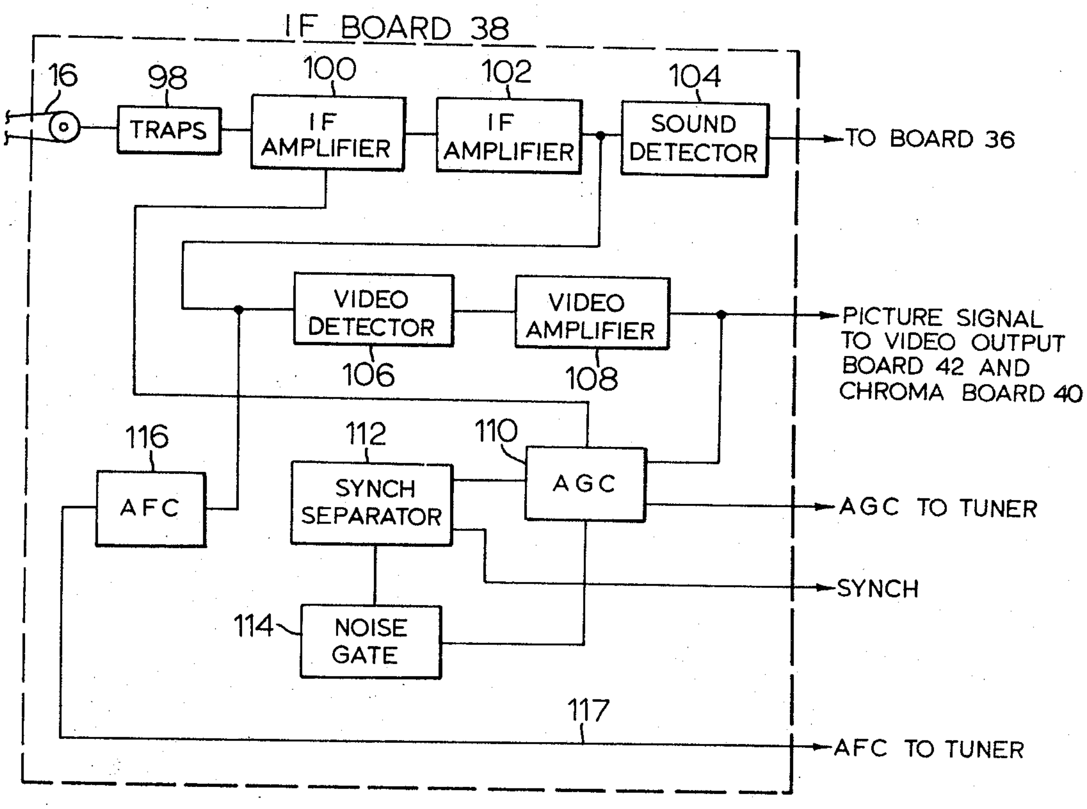

The IF board 38, shown in FIG. 6, receives IF signals via a lead 96 from the tuner assembly. The signal passes through frequency traps 98 and through first and second IF stages 100, 102 to a sound detector 104, from which it is conducted to the audio input stage 88 of FIG. 5. The signal from the second IF stage 102 is also directed to a video detector 106 and a video amplifier 108 to provide a picture signal for supply to the video output board 42 and to the chroma board 40 as will be described. Automatic gain control is provided by an AGC circuit 110 connected to the first IF amplifier 100. The AGC circuit 110 also feeds a synch separator circuit 112 which provides synch signals for the vertical and horizontal boards 44, 46. A noise gate 114 is provided to reduce the effect of noise on the synch separator. Automatic frequency control is provided by an AFC circuit 116 which directs its output to the tuner 16.

Figure 7:
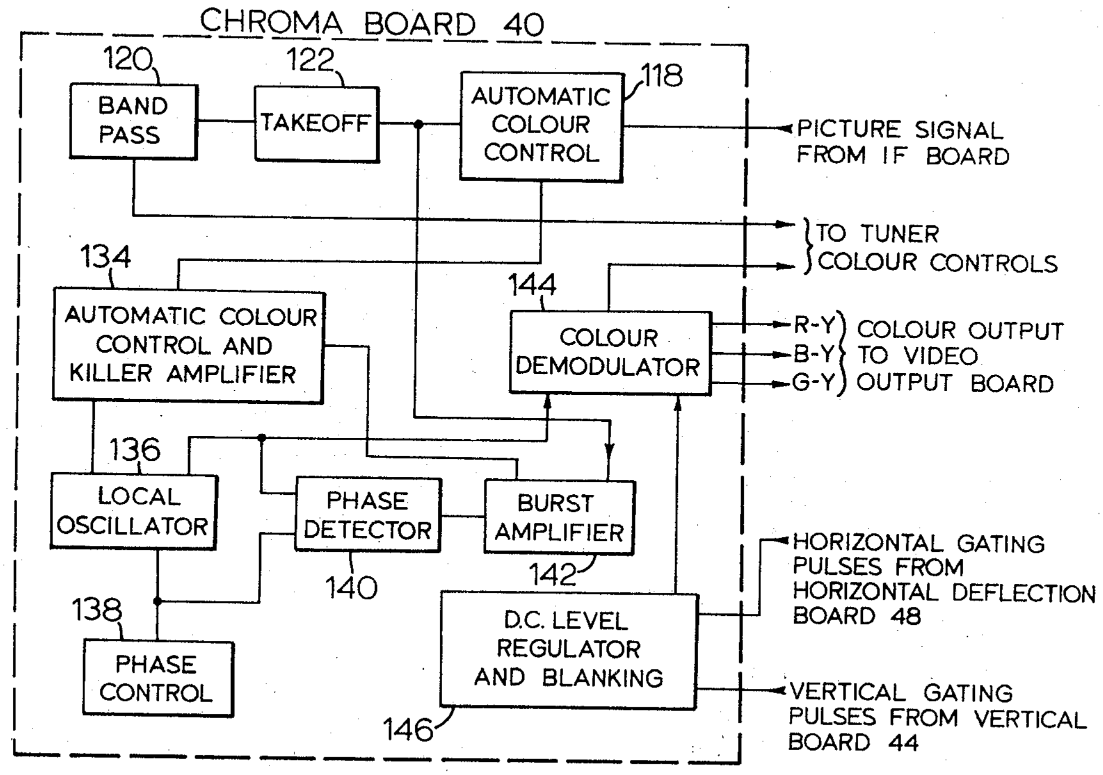

FIG. 7 shows the chroma board 40. The board 40 receives a picture signal input from the video amplifier 108 of the IF board 38. The picture signal input passes through an automatic color control circuit 118 controlled by the color controls on the tuner assembly operating through a band-pass amplifier 120 and a takeoff circuit 122. The chroma board also contains a conventional automatic color control and killer amplifier 134 (to control the gain of the band-pass amplifier for constant color output, and to reduce such gain to zero when no color signal is being received to prevent colored 'snow'), a local oscillator 136, a phase control circuit 138, a phase detector 140, a color burst amplifier 142, and a color demodulator 144 which provides the three color outputs to the video output board 42. The chroma board also contains a DC color level regulator and blanking circuit 146 controlled by horizontal gating pulses from the horizontal choke of the horizontal deflection board 48 and by vertical gating pulses from the vertical transformer of the vertical board 44.

Figure 8:
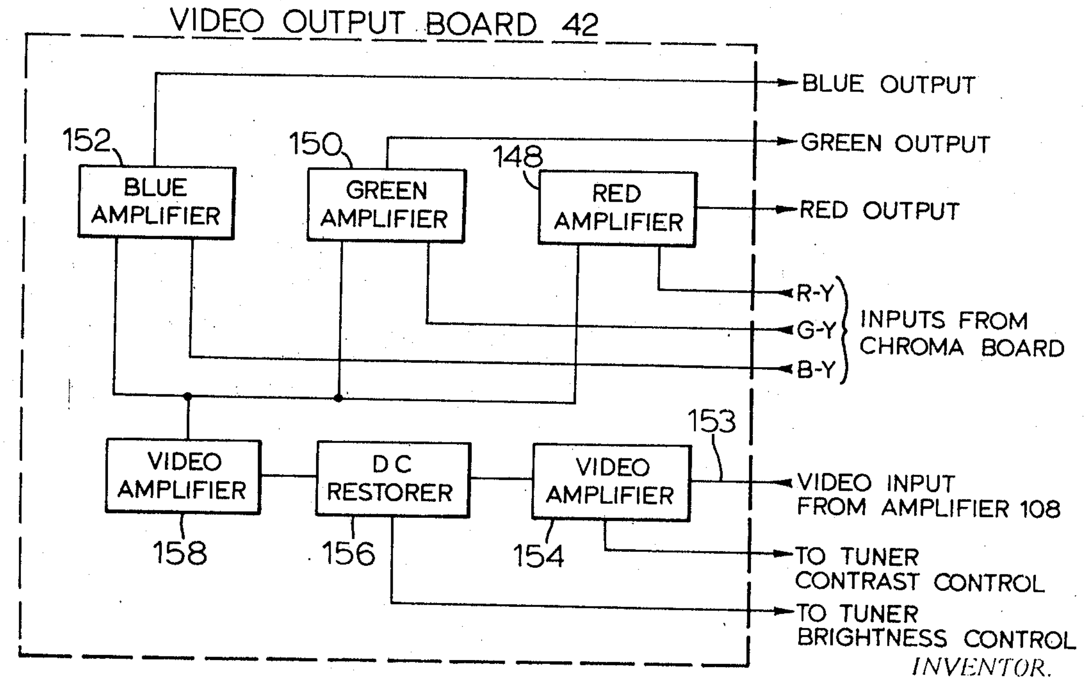

The video output board 42, shown in FIG. 8, receives three color inputs from the color demodulator 144 and passes these inputs to red, green and blue amplifiers 148, 150, 152 to provide red, green and blue outputs to the picture tube assembly. The video output board 42 also receives, via a lead 153, the video picture signal from the video amplifier 108 of the IF board 38. The black and white portion of this signal is amplified by a video amplifier 154 (amplifier 154 has insufficient bandwidth to amplify the color components of the signal). The amplified black and white signal is then passed through a DC restorer 156 and through another video amplifier 158 and is used to control the red, green and blue amplifiers. The video amplifier 154 is controlled by the contrast control on the tuner assembly, and the DC restorer 156 is controlled by the brightness control on the tuner assembly.

Figure 9:
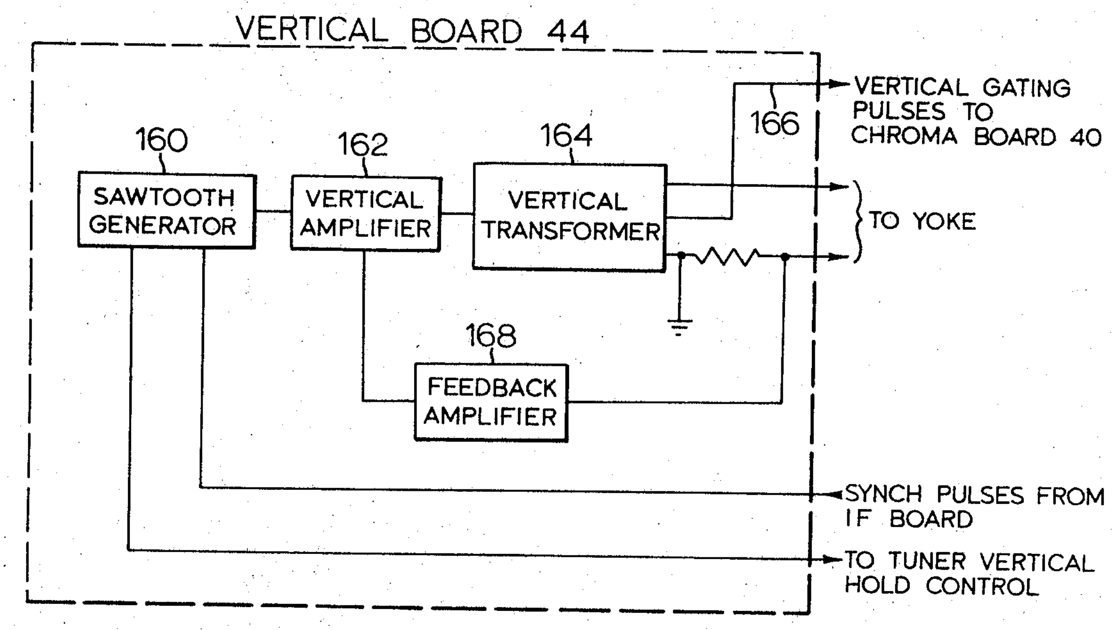

The vertical board 44, shown in FIG. 9, contains a sawtooth generator 160 controlled by synch signals received from the synch separator 112 of the IF board 38, and also by the vertical hold control on the tuner assembly. The signal produced by generator 160 is passed through a vertical amplifier 162 and through a vertical transformer 164 and applied to the yoke of the picture tube. A reduced voltage vertical gating pulse output is supplied to lead 166 for delivery to the DC regulator and blanking circuit 146 of the chroma board. A feedback amplifier 168 ensures stability.

Figure 10:
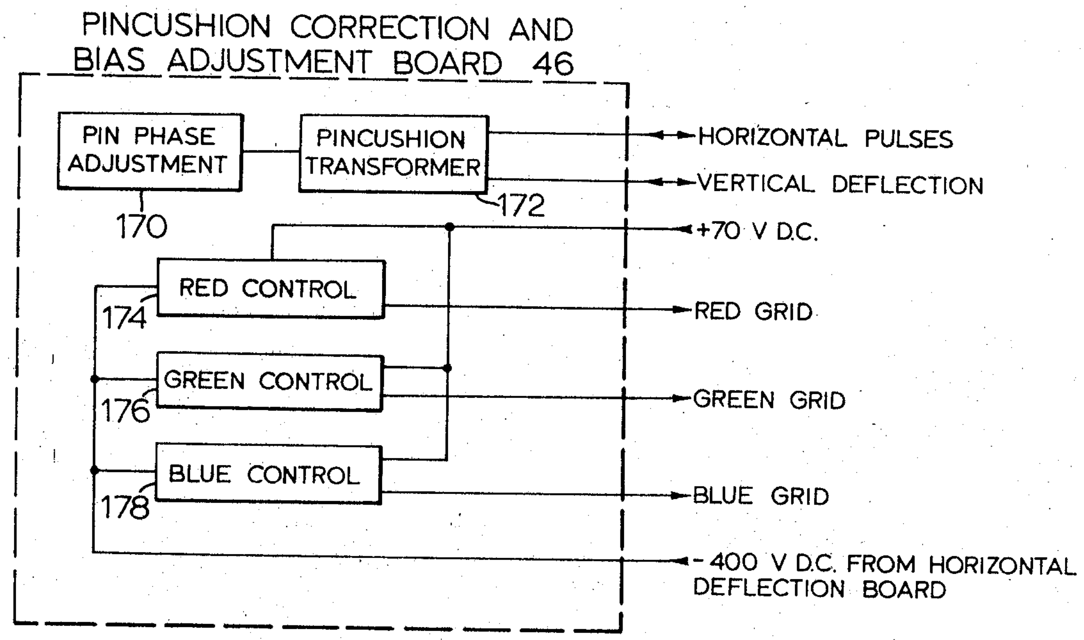

The pincushion correction and bias adjustment board 46, shown in FIG. 10, contains a pin-phase adjustment control 170 which adjusts a pincushion transformer 172. The vertical deflection signal from vertical transformer 164 to the yoke is passed through transformer 172 in conventional manner, as is the horizontal deflection signal from the horizontal choke on the horizontal board 48, to provide pincushion correction. The board 46 also includes bias controls 174, 176, 178 supplied with DC voltage from the power supply and audio board 36 and from the horizontal deflection board 48 (which generates −400 volts from the low-voltage supply). The bias controls 174 to 176 have outputs directed to the red, green and blue grids of the electron guns of the picture tube.

Figure 11:
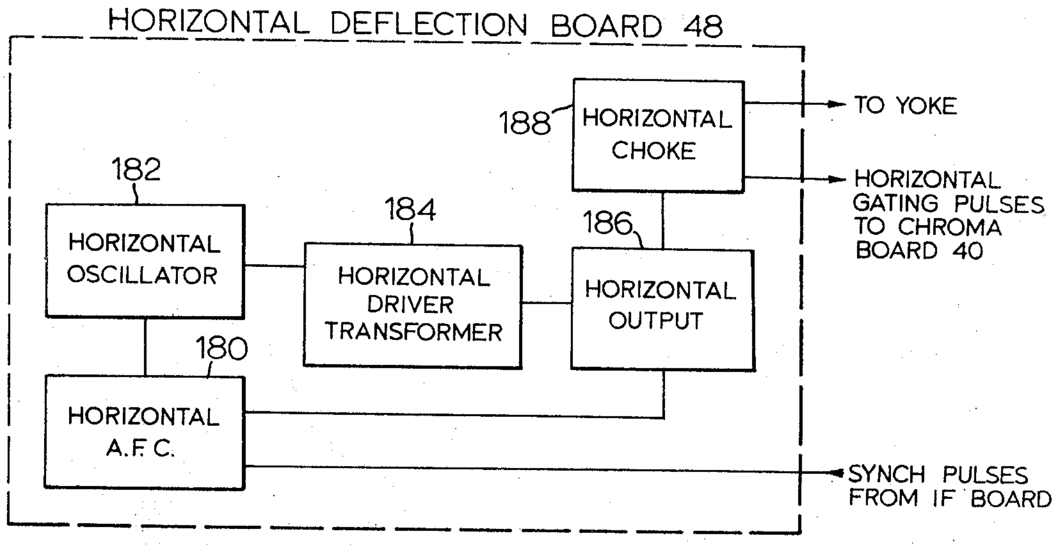
FIGS. 5 to 11 are block diagrams of the circuits contained on the circuit boards of the chassis of FIGS. 1 and 2.

The horizontal deflection board 48, shown in FIG. 11 receives synch pulses via a horizontal automatic frequency control circuit 180. These pulses stabilize a horizontal oscillator 182 which drives a horizontal driver transformer 184, the output of which is connected through a horizontal driver transformer 184 to a horizontal output circuit 186 and then to a horizontal choke 188. The choke output is passed to the yoke and is also applied to the pincushion transformer 172 for correction. In addition, a reduced voltage sample of the choke output is provided at lead 190 for delivery to the chroma board 40.

Figure 12:
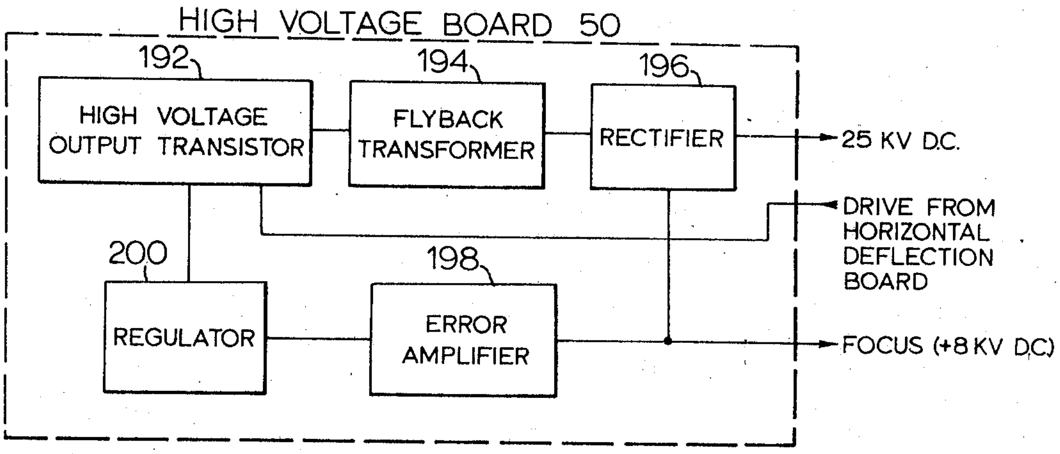

The high-voltage board 50, shown in FIG. 12, receives power from power supply board and also receives the 400 volts generated by the horizontal deflection board 48. The high-voltage drive is applied (via leads not shown) to a high-voltage output transistor 192 and then to a flyback transformer 194 which delivers its output through a rectifier 196 to provide the 25 kv. DC needed for the picture tube. A sample of the high voltage at about 8 kv. DC is bled off from the rectifier 196 and used for focusing, and is also directed to an error amplifier 198 and a regulator 200 to control the output transistor 192, to regulate the high voltage.

The reason for the particular order in which the circuit boards are arranged in the chassis 20 is as follows. Circuit boards 36 to 42 are located at the left-hand side of the chassis because in the set illustrated, the tuner assembly is located at the left-hand side of the chassis, and the tuner has connections to all of the first four circuit boards. In addition, there is a large number of connections between boards 36 and 38, and also a large number of connections between board 38, 40, but there are relatively few connections between boards 36, 40. In addition, the video output board 42 receives signals only from the IF board 38 and from the chroma board 40, primarily from the chroma board, and has outputs to the tuner, so that the order shown for the first four boards is important for maximum wiring efficiency.

The pincushion correction and bias adjustment board 46 receives signals both from the vertical board 44 and from the horizontal board 48, so it is ideally located between these boards. The high-voltage board 50 is fed from the horizontal board 48 with no connection to any other board (except board 36), so it is ideally placed at the end of the assembly. It feeds only the picture tube, via a direct wire which plugs onto the picture tube.

The order in which the tuner assembly, degaussing coils, picture tube, etc., are connected to the interconnecting board 58 is indicated in FIG. 2. As there shown, the interconnecting board 58 includes a series of connector sockets 202, 204, 206 and 208 mounted on its upper edge. The socket 202 connects to the wires which lead to the degaussing coils. Since the degaussing output is from the power supply and audio board 36, the socket 202 is conveniently located at the left hand side of the interconnecting board. The socket 204 connects to wires 212 (FIG. 1) to the tuner assembly 18, which contains the controls for the set. Socket 204 is located close to the circuit board 36 to 42 to reduce wiring lengths.

The socket 206 is for the wires from the convergence assembly (not shown) which receives signal from the vertical and horizontal boards 44, 48 so socket 206 is located between these boards. Finally, the socket 208 is for the cable (not shown) from the yoke and connects to boards 48 and 44, so this socket is located at the right-hand side of the chassis. The arrangement shown for the sockets reduces the complexity of the printed wiring layout on the interconnection board 58. In addition the sockets are within easy reach to permit connection and disconnection of the chassis to the remainder of the set.

In addition to the sockets shown, there are also numerous connections from the interconnecting board 58 to the picture tube. These connections originate from a number of the circuit boards, and are made via leads soldered or clipped directly to the interconnecting board 58. No plug and socket arrangement is needed on the interconnecting board, because the leads plug onto the picture tube and can easily be unplugged therefrom for removal of the chassis.

The circuit board arrangement shown particularly lends itself to service adjustments through the back cover of the television set. For example, as shown in FIG. 3, some of the circuit boards such as board 42 contain controls which occasionally require adjustment. Two such controls are shown at 214, 216 and control potentiometers to adjust the gains of the green and blue amplifiers 150, 152 respectively. The control shafts 214, 216 project from the rear edge of the circuit board 42 and hence project through corresponding holes in the back cover 218 of the set when the frame and chassis are installed in the cover.

Typically for a 25-inch color television set, the frame 2 is 26½ inches long and 16 inches deep, while the chassis 20 is 20½ inches long and about 7½ inches deep. These dimensions are of course approximate and will vary depending upon the size of the set, but it will be noted that the chassis 20 extends across a substantial portion of the rear of the set, preferably across at least half of the rear and in the embodiment shown across more than three quarters of the rear. This provides efficient spacing for good cooling of the components. The height of the chassis 20 is such that, as shown in FIG. 1A, it fits just under the components mounted at the rear tip of the picture tube. To shorten the front to rear dimension of the set, a small cutout 220 (FIGS. 1 and 2) is provided in the front edge of the chassis, between the boards 42, 44.

Because each of the circuit boards 38 to 50 is of the same height and is on the same level, a chimney effect is created in which cool air is sucked up to cool each circuit board individually. There are no circuit boards set one on top of the other to cause temperature nonuniformities. This arrangement further assists in providing cooling of the components.

It will also be noted that the various functions of the set are generally separated, with a separate function on each circuit board, except in one or two cases (such as board 38) where two functions are present on one board. This separation of functions facilitates servicing, since individual boards can be removed and replaced by new boards to test individual functions, or at the most two functions. If it is desired to test a circuit board while in place, an extension board can be used, plugged into the connector of the circuit board in question and having a further connector on its rear edge into which the board under test can be plugged. The extension board will have notches in all four locations 69 so that it can be plugged into any connector 64 and will have printed wiring from each connector clip 66 of the interconnecting board connectors 64 to each of its own corresponding connector clips.

Although the invention has been described in connection with a color television set, it could also be used for a black and white television set. In addition, although the chassis 20 has been shown at the rear of the set, it could be located at the front, under the picture tube (the picture tube would of course have to be raised), and circuit boards could then be inserted or removed through the front of the set. The chassis 20 could also be located along one of the lateral edges of the set, or could be L-shaped or split and could be placed along two edges, but placement of a single chassis along a front or rear edge is much preferred.

What I claim as my invention is:

1. In a color television set, a frame having front and rear edges and means adapted to support a picture tube with the screen of said picture tube adjacent the front edge of said frame, said frame further including means to support a tuner assembly adjacent said front edge of said frame; and an elongated component chassis mounted on said frame adjacent the rear edge of said frame, said chassis containing a plurality of plug-in circuit boards, and glide means for supporting said circuit boards in a substantially vertical orientation for sliding movement frontwardly and rearwardly, said boards being spaced horizontally one from the other and extending in a front to rear direction, an interconnecting board at the front of said chassis, cooperating plug and socket means on said circuit boards and on said interconnecting board to permit said circuit boards to be plugged into said interconnecting board, the rear of said chassis being open so that said circuit boards may be moved into and removed from said chassis from the rear, the rear part of said frame and the bottom and top of said chassis having openings therein to permit air circulation upwardly past the components on said circuit boards, said picture tube including a rear tip having a convergence assembly thereon located with a predetermined clearance above said frame, and the height of said chassis is less than said predetermined distance so that said chassis will fit beneath said convergence assembly.

2. Apparatus according to claim 1 wherein said circuit boards are all of the same height.

3. Apparatus according to claim 2, wherein the length of said chassis is at least half the side-to-side width of said frame.

4. Apparatus according to claim 1 wherein said set includes a low-voltage power supply circuit, a high-voltage power supply circuit, an intermediate frequency and detector circuit for providing a picture signal from a received signal, a sound detector, a discriminator and amplifier circuit for providing an audio signal from said received signal, a synch separator circuit for providing synch signals, a color demodulator and control circuit for providing color output signals from said video signal, a vertical deflection circuit responsive to said synch pulses for providing a vertical deflection signal, a horizontal deflection circuit responsive to said synch pulses for providing a horizontal deflection signal, and a pincushion correction circuit, all of said circuits being mounted on said circuit boards.

5. Apparatus according to claim 1 wherein a first of said circuit boards contains a low-voltage power supply circuit, a second of said circuit boards contains an intermediate frequency and detector circuit for providing a picture signal from a received signal, a third of said circuit boards contains a color demodulator and control circuit for providing color signals from said video signal, a fourth of said circuit boards contains a color signal amplifying circuit for amplifying said color signals and a video amplifier for amplifying said picture signal without its color components, a fifth of said circuit boards contains a vertical deflection circuit responsive to said synch pulses for providing a vertical deflection signal, a sixth of said circuit boards contains a pincushion correction circuit and a color bias adjustment circuit for providing pincushion correction and bias adjustment, a seventh of said circuit boards contains a horizontal deflection circuit for providing a horizontal deflection signal, and an eighth of said circuit boards contains a high-voltage power supply circuit.

6. Apparatus according to claim 1, wherein said cooperating plug and socket means includes a plurality of elongated connectors mounted on said interconnecting board in a vertical orientation, said connectors including a plurality of connector clips for contacting circuits on said circuit boards, at least some of said clips in each connector bar containing obstructions therein to prevent admittance of said circuit boards, the front edge of each circuit board containing notches cooperating with said obstructions in its associated connector so that each circuit board can be plugged into its associated connector bar, the notches and obstructions in each circuit board and its associated connector being located differently from the notches and obstructions in any other circuit board and connector, to prevent plugging a circuit board into the wrong connector bar.

7. Apparatus according to claim 1, wherein at least some of said circuit boards contain circuit control shafts mounted thereon and projecting from the rear edges thereof, said set having a cover having holes for said control shafts, said control shafts being adapted to project through said holes in said cover for external adjustment of said set.

8. Apparatus according to claim 1, wherein said chassis includes a lower rear flange cooperating with the rear portion of said frame to locate said chassis in position along the rear edge of said frame.

9. In a color television set, a frame having front and rear edges and means adapted to support a picture tube with the screen of said picture tube adjacent the front edge of said frame, said frame further including means to support a tuner assembly adjacent said front edge of said frame; and an elongated component chassis mounted on said frame adjacent the rear edge of said frame, said chassis containing a plurality of plug-in circuit boards, and glide means for supporting said circuit boards in a substantially vertical orientation for sliding movement frontwardly and rearwardly, said boards being spaced horizontally one from the other and extending in a front to rear direction, an interconnecting board at the front of said chassis, cooperating plug and socket means on said circuit boards and on said interconnecting board to permit said circuit boards to be plugged into said interconnecting board, the rear of said chassis being open so that said circuit boards may be moved into and removed from said chassis from the rear, the rear part of said frame and the bottom and top of said chassis having openings therein to permit air circulation upwardly past the components on said circuit boards; a first of said circuit boards containing a low-voltage power supply circuit, a second of said circuit boards containing an intermediate frequency and detector circuit for providing a picture signal from a received signal, a third of said circuit boards containing a color demodulator and control circuit for providing color signals from said video signal, a fourth of said circuit boards containing a color signal amplifying circuit for amplifying said color signals and a video amplifier for amplifying said picture signal without its color components, a fifth of said circuit boards containing a vertical deflection circuit responsive to said synch pulses for providing a vertical deflection signal, a sixth of said circuit boards containing a pincushion correction circuit and a color bias adjustment circuit for providing pincushion correction and bias adjustment, a seventh of said circuit boards containing a horizontal deflection circuit for providing a horizontal deflection signal, and an eighth of said circuit boards containing a high-voltage power supply circuit, said tuner assembly being located at one side of said set, said chassis having a first side adjacent said one side of said set and a second side adjacent to the other side of said set, said first circuit board being located adjacent said first side of said chassis, said eighth circuit board being located adjacent said second side of said chassis, and the remaining circuit boards being arranged in numerical order between said first and eighth circuit boards.

10. Apparatus according to claim 9 wherein said first circuit board further contains an audio circuit including a discriminator for generating an audio signal for a loudspeaker of said set.

11. Apparatus according to claim 9 wherein said interconnection board includes a plurality of sockets mounted on its upper edge, one of said sockets being located near said one side of said set and being for connection to said tuner assembly, another of said sockets being located near the other side of said set and being for connection to the yoke of said picture tube.

* * * * *